May 10, 1949.  E. D. DALL  2,469,816
BUMPER GUARD
Filed Jan. 15, 1945
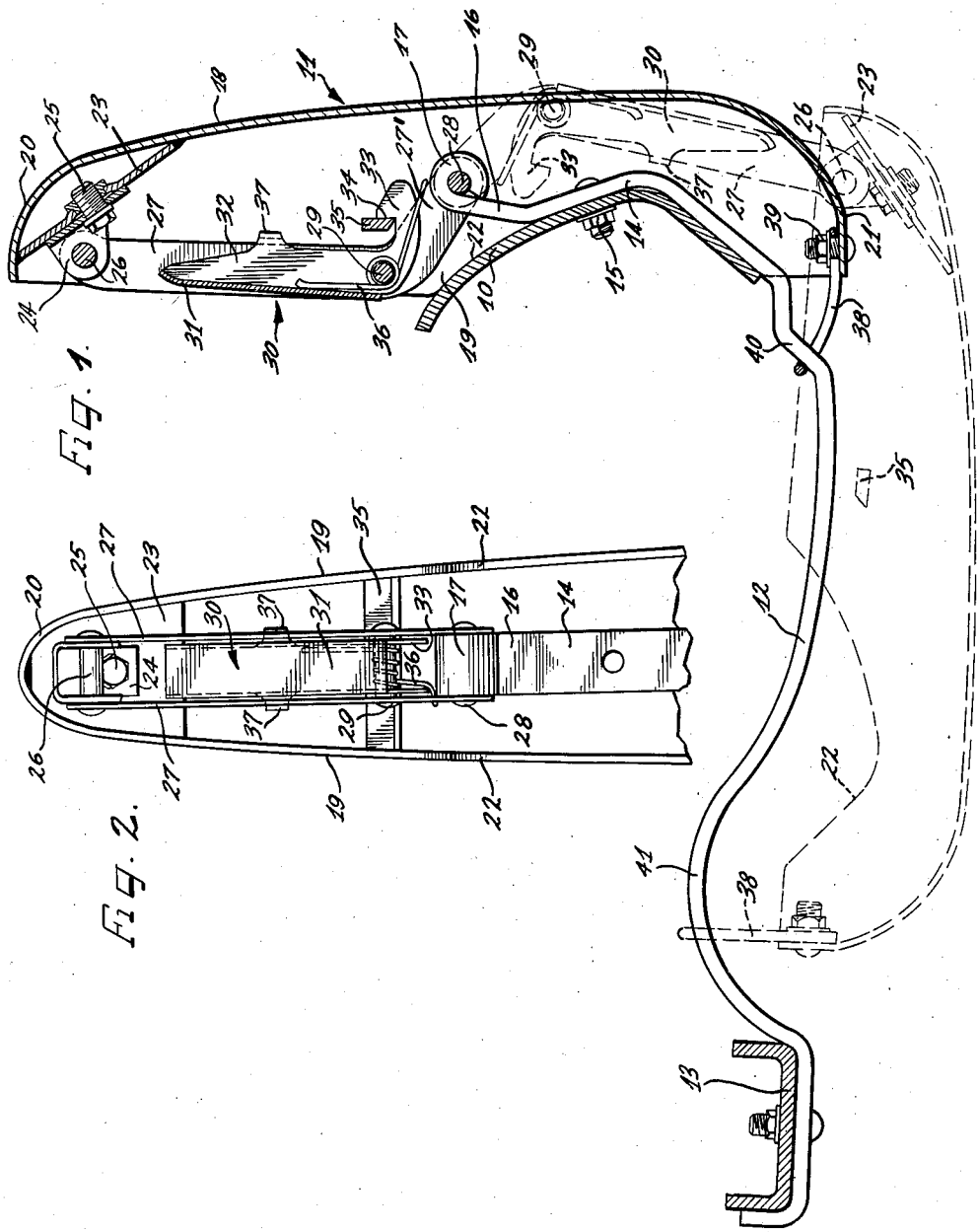
Inventor
Edward D. Dall
by The Firm of Charles H. Sells Attys.

Patented May 10, 1949

2,469,816

UNITED STATES PATENT OFFICE 2,469,816

BUMPER GUARD

Edward D. Dall, Detroit, Mich., assignor to Houdaille-Hershey Corporation, Detroit, Mich., a corporation of Michigan Application January 15, 1945, Serial No. 572,781

9 Claims. (Cl. 293—64)

This invention relates to automobile bumper guards and particularly to the type of bumper guard in which the guard body, without being entirely detached from the bumper, may be readily moved out of the way so as to permit unobstructed and convenient access to automobile structures, such as the trunk or baggage compartment at the rear of the automobile body.

An important object of the invention is to provide a guard which may be detachably latched to the bumper in service position to project upwardly from the bumper bar behind the trunk or baggage compartment to afford protection against bumps from bumpers on other cars, and which, when unlatched, may be swung bodily outwardly and downwardly and shifted to horizontal position below and inwardly of the bumper bar to be entirely out of the way so that easy unobstructed access may be had to the trunk or baggage compartment door and out of the way of the knees or legs when loading or unloading the trunk or baggage compartment.

A further object of the invention is to provide improved means for receiving and holding the guard body in its horizontal out of the way position and to permit it to be readily swung back for relatching thereof into service position on the bumper bar.

The various features of my invention will become apparent from the following specification in connection with the drawings, in which drawings Figure 1 is a longitudinal median section of the guard, the full lines showing it in service position and the dotted lines showing it swung into its horizontal or out of the way position; and Figure 2 is a rear elevation of the upper portion of the guard.

On the drawings, 10 indicates the rear bumper bar of an automobile, to be behind the trunk or baggage compartment at the rear end of the automobile body. 11 indicates my improved bumper guard which is usually applied to the middle of the bumper bar to project, when in service position, upwardly on the bumper bar to protect the trunk or baggage compartment and the rear end of the automobile body against bumps by the bumpers on other automobiles. A bracket or brace bar 12 is secured at its forward or inward end to a beam or other structural part 13 of the vehicle chassis. The bar or bracket extends generally horizontally rearwardly or outwardly from its support 13, its outer portion 14 being deflected upwardly and bent to the contour of the outer face of the bumper bar 10 to be secured thereto as by a rivet or bolt 15, the end portion 16 inclining outwardly away from the bumper bar and being bent around to provide a hinge sleeve 17.

The guard body is of generally channel or U-shaped cross-section and comprises the front impact wall 18, the side walls 19, the top wall 20 and the bottom wall 21. The side walls have the recesses 22 for receiving the bumper bar 10 and to fit at their edges the front convex curvature of the bar when the guard is in service position as shown by the full lines on Figure 1.

Within the upper part of the guard body a plate 23 is secured, as by welding, and to the inner side of this plate a U-shaped bracket 24 is secured as by means of a screw 25. A fulcrum pin 26 extends through the ears of the bracket 24 to receive at its outer ends the pair of links 27 which engage at their upper ends against the outer sides of the ears of the brackets 24 and extend downwardly to receive between their lower ends 27' the hinge sleeve 17 through which ends and the sleeve a fulcrum pin 28 extends. The upper portions of the links 27 extend substantially in vertical direction when the guard is in service position, while the lower ends 27' of the link deflect outwardly for hinge connection with the sleeve 17. Extending between and through the links at the juncture of their upper and lower portions is a fulcrum pin 29 for a latch lever 30 whose body extends upwardly between the links. This latch lever is of U-shaped cross-section with its yoke 31 adjacent to the forward edges of the links 27 and with its sides 32 extending rearwardly adjacent to the inner sides of the links. The lower portions 33 of the side walls 32 extend rearwardly from the fulcrum pin 29 to form latch tongues having the latch shoulders 34.

Extending between the side walls 19 of the guard body 18 is a keeper bar 35 which may be secured to the side walls as by welding. A spring 36 coils around the pin 29 between the side walls of the latch lever 30, one end of the spring engaging against the rear side of the latch lever yoke 31 while the other leg of the spring engages against the top of the end portion 27' of one of the links 27. This spring 36 tends to swing the latch lever 30 in counter-clockwise direction (Figure 1) to hold the latch shoulders 34 against the rear side of the keeper bar 35 to thus lock the guard body in service position.

Upon rearward pressure against the yoke part of the latch lever 30, the latch lever will be swung in clockwise direction to release the latch shoulders 34 from the bar 35 so that the guard body may then be swung with the links 27 outwardly and downwardly on the hinge connection between the hinge pin 28 and the hinge sleeve 17, as indicated by the dotted lines on Figure 1. Upon release of the latch lever 30 after such swing of the guard body, the spring 36 will return the latch lever to normal position, such movement being limited by the engagement with the adjacent edges of the links 27 by stop tongues 37 extending from the respective edges of the side walls 32 of the latch lever.

Secured to the bottom wall 21 of the guard body and extending normally forwardly therefrom is a guide member 38 which, as shown, may be a loop of spring wire receiving the brace bar 12 and secured at its outer end to the bottom wall 21 as by a bolt 39. Intermediate the outer portion 14 and the remainder of the brace bar, the bar has an angular upward bend providing the inclined portion 40 around which the inner portion of the guide loop 38 extends when the guard is latched in service position. Before application of the loop to the guard body it is longitudinally straight and not bent.

When the guard body is unlatched and is swung outwardly and downwardly into horizontal position, it may be shifted inwardly with the loop passing along the brace bar toward the inner portion 41 thereof which is convexed upwardly. When the guard body is shifted inwardly into its horizontal position below and inwardly of the bumper bar 10, the guide loop 38 will unbend as indicated by the dotted lines and will engage with the bar inwardly of the crest of the convex portion 41 and the guard body will then be held in this horizontal position entirely away from the rear of the trunk or baggage compartment and out of the way of the legs of the driver for entirely free access to the trunk or baggage compartment.

When it is now desired to return the guard to its service position, the guard body is shifted outwardly under guide engagement of the loop 38 with the bar 12 and is then swung upwardly with the links 27 on hinge connection with the hinge sleeve 17 back into service position against the bumper bar, and as the guard body approaches its service position the beveled lower edge of the keeper bar 35 thereon will engage with the rounded rear end of the latch tongues 33 for reengagement of the latch shoulders 34 in position at the rear or inner side of the bar 35 for relatching of the guard body in service position. As the guard body is being swung into service position, the end of the loop 38 is brought into engagement with the inclined inner side of the bar portion 40 and the loop is bent up, as shown by the full lines, and then, after latching of the guard body, the loop, by its spring action, exerts inward pull and upward pressure on the guard body to hold the lower part thereof against the bumper bar, and to hold the linkage against its fulcrums so as to take up lost motion and prevent rattling when the guard is in service position.

I have thus produced a simple but efficient bumper guard which may be readily latched into service position on a bumper bar or swung downwardly into horizontal position to be shifted and supported out of the way below and inwardly of the bumper bar, and whose various parts are all in the form of simple sheet metal parts. I do not, however, desire to be limited to the exact construction, arrangement, and operation shown and described as changes and modifications may be made without departing from the scope of the invention as defined in the appended claims.

I claim as my invention:

1. A bumper guard structure comprising a bracket attachable against the outer side of a bumper bar to extend transversely thereof, a guard body, a link pivoted at its upper end to the upper end of said body and having hinged connection at its lower end with said bracket for bodily swing of said body away from the bumper bar and downwardly into horizontal position, a latch connection between said link and said body for holding said body in vertical service position, said bracket at its lower end having a substantially horizontally disposed extension, a guide element on the lower end of said body receiving said extension to travel inwardly therealong for guiding said body into horizontal position below and inwardly of said bumper bar.

2. A bumper guard structure comprising a supporting bracket attachable to the outer side of a bumper bar, a guard body engageable against the outer side of the bumper bar to extend upwardly therefrom when in service position, a link pivoted at its upper end to the upper end of said body and at its lower end having hinge connection with said bracket, latch means for holding said body in service position, the lower part of said bracket extending inwardly relative to said bumper bar, a guide member on the lower end of said body receiving said extension, said body, after release of said latching means, being bodily swingable with said link on said hinge connection downwardly away from the bumper bar and then shiftable inwardly of the bumper bar under guidance of said guide member in substantially horizontal position below and inwardly of the bumper bar.

3. An automobile bumper guard structure comprising a supporting bracket attachable to the outer side of a bumper bar to extend transversely thereof, a guard body shaped to engage against the outer side of the bumper bar and to extend upwardly therefrom when in service position, a link pivoted at its upper end to the upper end of said body and having hinged connection at its lower end with the upper end of said bracket, a guide bar extending inwardly from the lower end of said bracket, a guide member on the lower end of said body receiving said guide bar, outward and then downward swing of said link relative to said bumper bar about the pivot provided by said connection hinge causing said body to swing downwardly and shift inwardly under the guidance engagement of said guide member with said guide bar to bring said body into position below and inwardly of the bumper bar, and latch means for releasably holding said body in service position on the bumper bar.

4. A bumper guard structure comprising a supporting bracket having a vertical portion for attachment to a bumper bar and a substantially horizontal portion extending inwardly from the bumper bar, a guard body engageable when in service position against the bumper bar to project upwardly therefrom, a guide member on the lower end of said body having guide engagement with the horizontal part of said bracket, a linkage connection between the upward end of said body and the vertical part of said bracket whereby upon outward and downward swing of said linkage the body will be swung downwardly and under guidance of said guide member on said horizontal bracket part will be shifted into substantially horizontal position below and inwardly of the bumper bar, and releasable latch means between said body and said linkage for normally latching said body in service position.

5. A bumper guard structure comprising a supporting bracket having a substantially vertical portion for attachment against the outer side of a bumper bar and having a substantially horizontal portion extending inwardly from the bumper bar, a guard body adapted when in service position to engage against the outer side of the bumper bar and to project upwardly therefrom, a guide member at the lower end of said body having guide engagement with the horizontal part of said bracket, a linkage connection between the upper end of said body and the vertical portion of said bracket swingable away from the bumper bar and then downwardly for causing bodily downward swing of said body and lateral shift thereof under guidance of said guide member into substantially horizontal position below and inwardly of the bumper bar, a latch lever on said linkage, and an abutment on said body engageable by said latch lever to normally latch said body in service position.

6. A bumper guard structure comprising, in combination, a support attachable to a bumper bar, a guard body, a releasable service connection between said body and said support, cooperative means on said support and on said body operative in the released condition of the body to guide the body into an out of the way position inwardly relative to the associated bumper bar, said cooperating means comprising a guide bar extending inwardly relative to the bumper bar from said support, and a spring loop on said body engaged about said bar, said guide bar having portions thereon cooperable with said spring loop for respectively maintaining the structure rattle-free in the service condition of the body and for retaining the body in said out of the way position when released and moved into the latter position.

7. In combination in a bumper guard structure, a bumper guard body, means for releasably supporting the bumper guard body in service position relative to a bumper, and movement controlling structure including a bar element extending inwardly relative to the bumper a distance approximately equal to the length of the guard body and a loop on the lower end of the guard body slidably engaging said bar element for guiding the guard body into a horizontal position below and rearwardly of the bumper upon release from said service position.

8. A bumper guard structure comprising a bracket attachable against the outer side of a bumper bar to extend transversely thereof, a guard body, a link pivoted at its upper end to the upper end portion of said body and having hinged connection at its lower end with said bracket for bodily swinging of said body away from and downwardly relative to the bumper bar into a horizontal position below the bumper bar, latch means for holding said body in vertical service position, an elongated bar element extending inwardly relative to said bracket a distance approximately equal to the length of said guard body, and guide structure on the lower end portion of said guard body slidably engaging said bar element for guiding the guard body into said horizontal position slung under said bar element.

9. In combination in a bumper guard, an elongated bumper guard body, a link pivotally connected at one end to the guard body, means providing a hinge connection for the opposite end of the link with a bumper, the link being of a length to drop the bumper guard from an upright service position relative to and projecting above the bumper into a position below the bumper, an elongated member extending rearwardly beyond the lower end of the guard body, considered with respect to its service position, a distance at least as great as the length of the guard body, and means on the lower end portion of the guard body connecting it with said member to guide the lower portion of the guard body rearwardly when the guard body is dropped as aforesaid.

EDWARD D. DALL.

REFERENCES CITED

The following references are of record in the file of this patent:

UNITED STATES PATENTS

| Number | Name | Date |
| --- | --- | --- |
| 2,173,276 | Jandus et al. | Sept. 19, 1939 |
| 2,179,070 | Weise | Nov. 7, 1939 |